April 17, 1956 C. KOSTKA 2,741,953
COMBINED SHAPER, FILING AND SAWING ATTACHMENT FOR LATHES
Filed Oct. 9, 1952 3 Sheets-Sheet 1
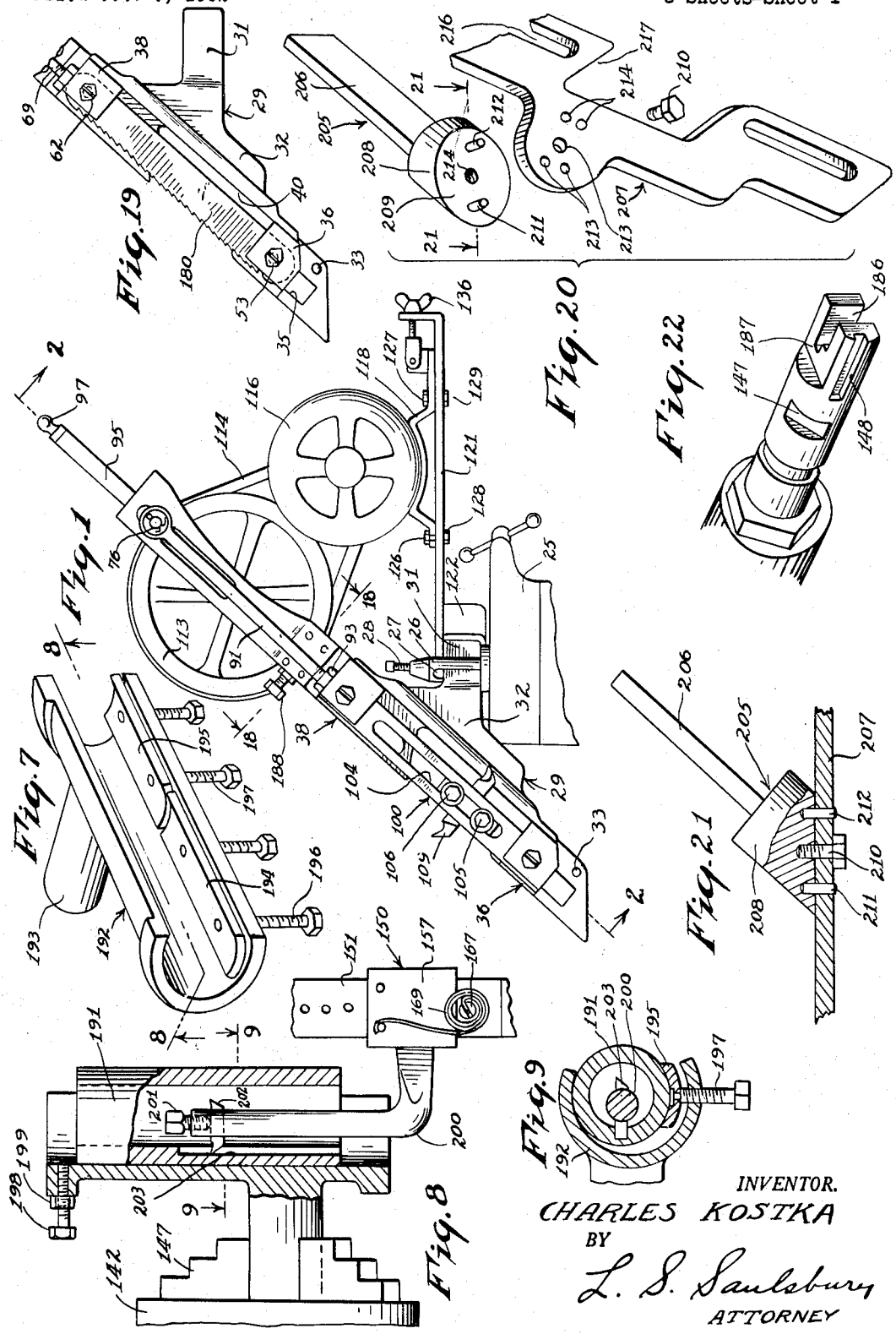
INVENTOR.
CHARLES KOSTKA
BY
ATTORNEY April 17, 1956 C. KOSTKA 2,741,953
COMBINED SHAPER, FILING AND SAWING ATTACHMENT FOR LATHES
Filed Oct. 9, 1952 3 Sheets-Sheet 2
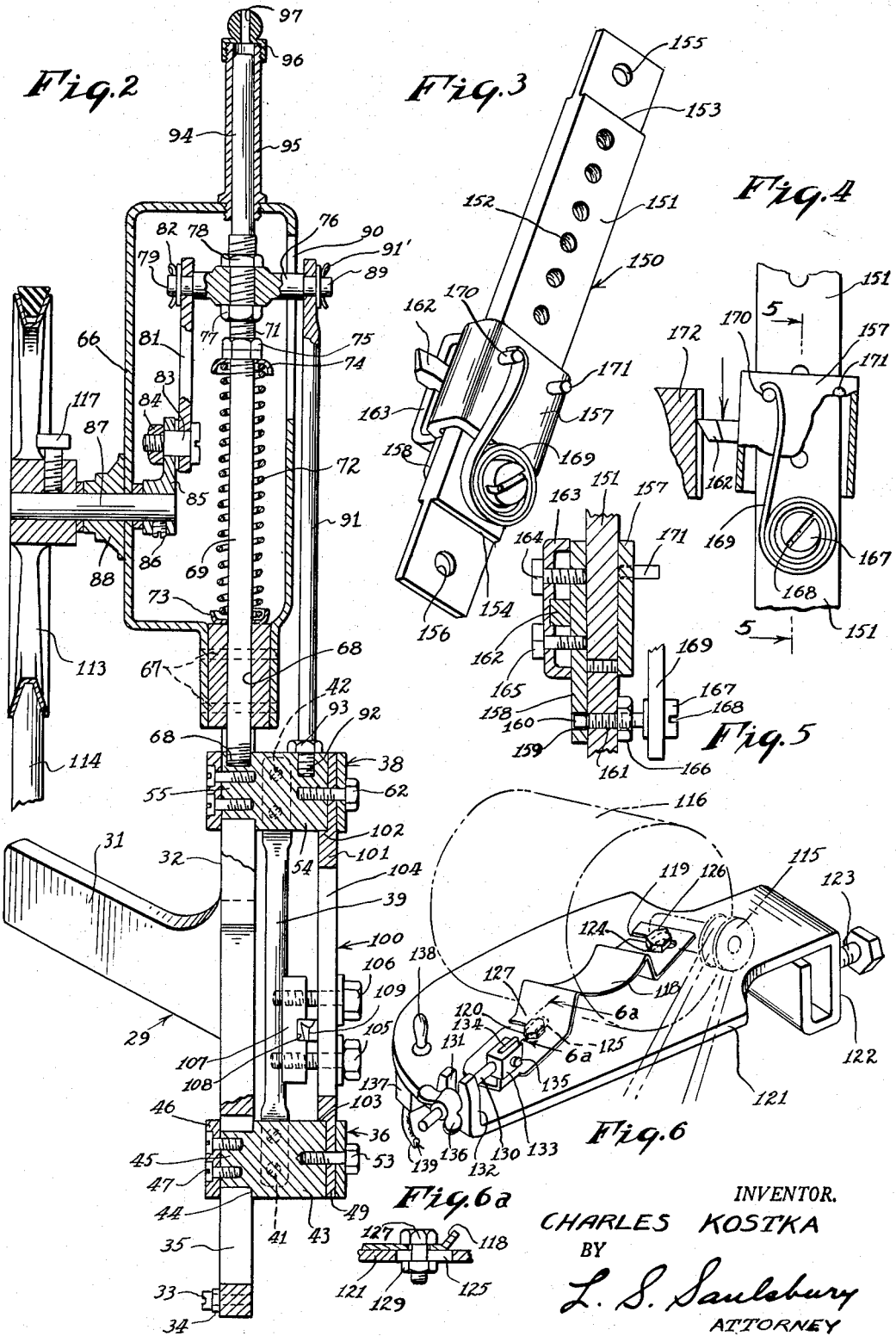
INVENTOR.
CHARLES KOSTKA
BY
L. S. Saulsbury
ATTORNEY April 17, 1956
C. KOSTKA
2,741,953
COMBINED SHAPER, FILING AND SAWING ATTACHMENT FOR LATHES
Filed Oct. 9, 1952
3 Sheets-Sheet 3
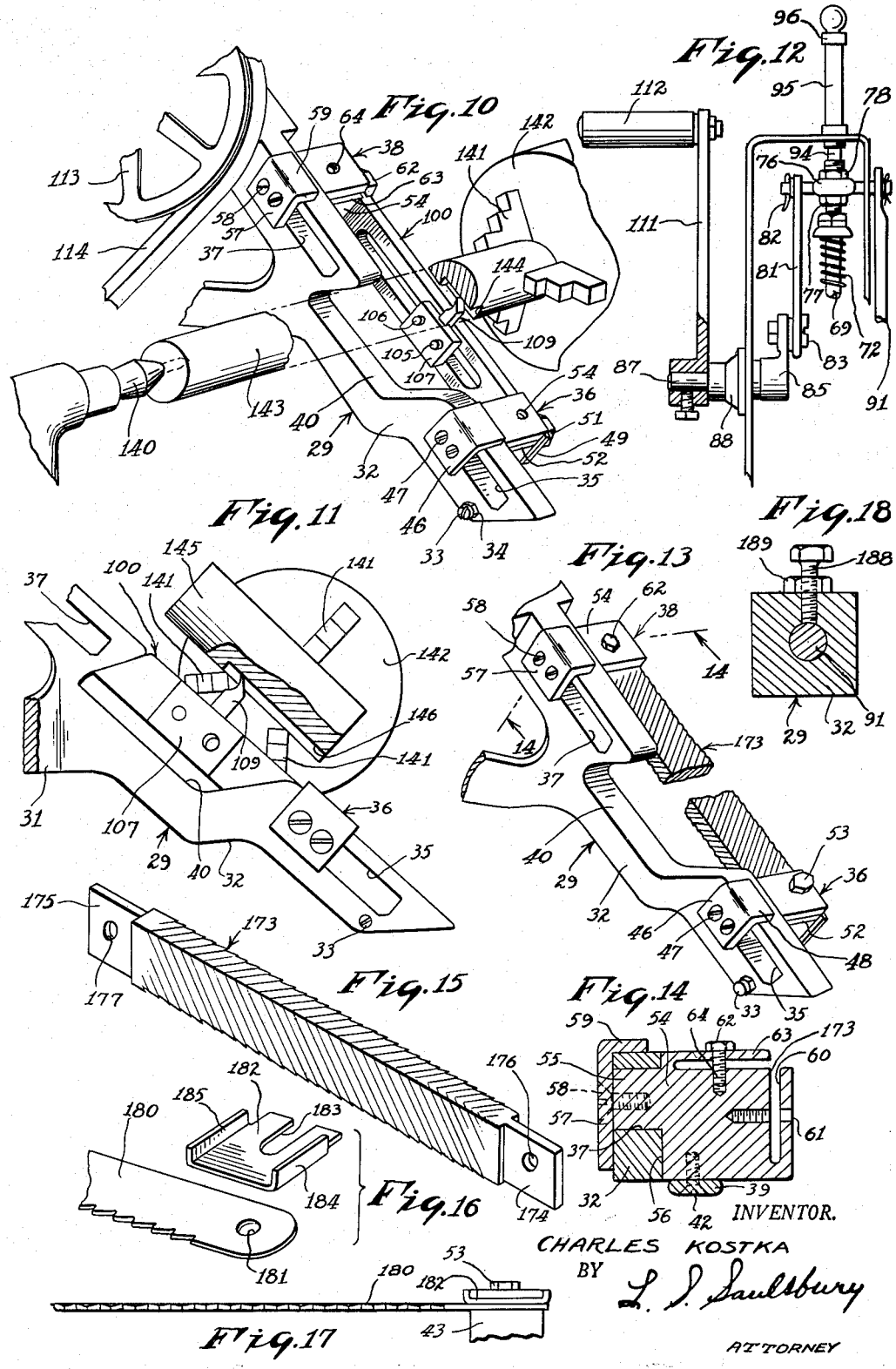
INVENTOR.
CHARLES KOSTKA
BY L. J. Saulsbury
ATTORNEY

United States Patent Office 2,741,953
Patented Apr. 17, 1956

2,741,953

COMBINED SHAPER, FILING AND SAWING ATTACHMENT FOR LATHES

Charles Kostka, Bronx, N. Y.

Application October 9, 1952, Serial No. 313,917

6 Claims. (Cl. 90—44)

This invention relates to self-driven shaping, filing and sawing tool attachment for metal turning lathes.

It is an object of the present invention to provide a combined shaping, filing and sawing attachment for metal turning lathes which can be connected to the ordinary tool post of the compound carriage and supported thereby to effect a cutting operation on a piece of metal stock carried by the lathe chuck or by the special holder adapted to fit the lathe chuck and so that the lathe can thereby be adapted to make cuts on a piece of stock which heretofore had required the use of a special shaper machine, and whereby cuts of the nature of slots extending transversely of the diameter of the stock piece or longitudinally thereof in the form of a keyway, either externally or internally of the stock piece, may be cut and made on an ordinary lathe bed.

It is another object of the invention to provide in a shaping tool attachment for metal turning lathes reciprocating members spaced from one another having means by which different tool holding elements can be attached to the reciprocating members to effect cuts upon the work piece, either in a vertical plane, normal to the lathe axis, or in a longitudinal plane, co-extensive and parallel to the axis, and wherein the sliding members can be made rigid and held against reciprocating movement by a locking screw means so that the working operation can be effected with the attachment as if the tool point were made rigid with an ordinary tool holder adapted to be fixed to the tool post of the compound rest or carriage.

It is another object of the invention to provide in a shaping tool attachment for metal turning lathes a shaping attachment which can be converted from an attachment adapted to be operated by a simple crank means to an attachment adapted to be operated by an electric driving motor, wherein the driving motor is carried on a simple supporting plate adapted to be connected to the tool holder part of the attachment and the electric motor connected through a pulley belt with a pulley wheel on the drive shaft of the attachment, and wherein the electric motor can be adapted on its base support to tighten or loosen its connection to the pulley belt with the pulley wheel of the drive shaft of the tool attachment.

It is another object of the invention to provide a shaping tool attachment for metal turning lathes wherein the detachable tool point holding element that is adapted to be connected between the reciprocating parts has clamp members for the tool point which can be located at different positions on the holder bar and to which a spring element is connected to urge the clamping members for the tool point and the tool point normally toward the work for engagement of the point with the work during the cutting stroke.

It is another object of the invention to provide in a shaping tool attachment for metal turning lathes reciprocating members which are held rigidly to withstand the load upon the cutting point and which are adapted to receive either the holder for the cutting point or hack saw blades or a cutting file, and wherein these work engaging tool elements can be held at different angles and are easily replaceable.

It is another object of the invention to provide in a shaping tool attachment for metal turning lathes a two-part bracket support or main attaching body for the reciprocating slide assemblies to which the tool element holders are attached, one part adapted to be fixed to the tool post, and the other part angularly and adjustably connected thereto so that the pitch of the tool holder part relative to the tool post part can be altered to vary the angle of cut of the cutting elements.

Other objects of the invention are to provide a combined self-driven shaping, filing and sawing attachment for a metal turning lathe, having the above objects in mind, which is of simple construction, inexpensive to manufacture, has a minimum number of parts, easy to adjust and adapt to the work, effects accurate cutting operations, self-contained, portable and easy to install upon the lathe, compact, rugged and sturdy, easy to convert from a hand-operated tool to a motor-operated tool, of pleasing appearance and efficient in operation.

For other objects and for a better understanding of the invention, reference may be had to the following detailed description taken in connection with the accompanying drawing, in which:

Figure 1 is a side elevational view of the combined shaping, filing and sawing attachment embodying the features of the present invention and of the electric motor and supporting base therefor, assembled with the attachment;

Fig. 2 is an enlarged longitudinal sectional view of the attachment, as viewed on line 2—2 of Fig. 1, and looking in the direction of the arrows thereof;

Fig. 3 is an enlarged perspective view of one of the detachable tool element holders showing the clamping plates with the cutting points connected thereto, and with the spring urging the clamping plates and the cutting point outwardly from the holder bar and toward the work;

Fig. 4 is a fragmentary elevational view of the tool point holder shown in Fig. 3 with portions of the slide being broken away and with the tool point being returned over the work piece;

Fig. 5 is a fragmentary vertical sectional view of the tool point holder, shown in Fig. 3, taken generally on line 5—5 of Fig. 4;

Fig. 6 is a perspective view of the supporting bracket for the electric motor;

Fig. 7 is a perspective view of the work holder adapted to be fitted into the lathe chuck;

Fig. 8 is a sectional view of the lathe chuck work holder and of a special cutting tool adapted to operate on the inner side of the work piece, the work holder being viewed on line 8—8 of Fig. 7;

Fig. 9 is a transverse sectional view taken on line 9—9 of Fig. 8;

Fig. 10 is a fragmentary perspective view of the shaping tool attachment with the tool point holder disposed in the attachment to effect a transverse cut on a shaft work piece carried between the lathe center and the chuck;

Fig. 11 is a fragmentary elevational view of the tool shaping attachment having the tool point engaging with a work piece held transversely across the lathe chuck and in position to have a keyway slot cut into the bottom surface thereof;

Fig. 12 is a fragmentary view of the tool working attachment provided with a handle for operating the sliding parts by hand;

Fig. 13 is a fragmentary perspective view of the tool shaping attachment bearing a file element;

Fig. 14 is an enlarged transverse sectional view taken on line 14—14 of Fig. 13;

Fig. 15 is a perspective view of the file tool element;

Fig. 16 is a collective and perspective view of one end of a hacksaw blade and of a spacer used when one hack saw blade is attached to the slide block assemblies;

Fig. 17 is a fragmentary elevational view illustrating the manner in which the hacksaw blade is attached to the slide block assembly;

Fig. 18 is a sectional view of the locking screw arrangement to lock the drive shaft so that the attachment is used as an ordinary cutting tool without disturbing the work, the view being taken on line 18—18 of Fig. 2;

Fig. 19 is a side elevational view of the attachment with a hacksaw blade connected thereto;

Fig. 20 is a collective and perspective view of a modified form of construction whereby the bracket attaching body is made of two parts;

Fig. 21 is a fragmentary sectional view taken generally on line 21—21 of Fig. 20, the parts being assembled and made fixed in an adjusted position and locked by the bolt; and Fig. 22 is a perspective view of a work piece into which several different cuts have been made with the different cutting elements of the tool attachment of the present invention.

Referring now particularly to Figs. 1 and 2, 25 represents the carriage of a metal turning lather from which there extends upwardly a tool post 26 having a vertically-extending slot 27 and an elongated clamp screw 28. The carriage is movable over the bed of the lathe and can be interconnected with the lathe drive to be moved therealong by power. It also can be adjusted in the usual manner by means of the usual hand knob so that it can be positioned along the bed of the lathe and also locked thereto.

The tool attachment constructed according to the present invention is adapted to be attached to the tool post 26 of the lathe carriage. For this purpose, the attachment has a bracket support or main attaching body 29 with a horizontal projection 31 which is extended through the vertical slot 27 of the tool post 26 and is made rigid therewith by the clamping screw 28. This bracket support 29 has an inclined portion 32 that will extend in an inclined manner when the attachment is set up for operation transversely of the lathe bed. On the lower end of the inclined portion is an adjustable screw 33 with a lock nut 34 to hold the screw 33 in its adjusted position. With the tool post 26 being loosened so that it can swivel, the attachment is swung transversely on the lathe, normal to the longitudinal axis thereof, and the screw 33 adjusted to engage the compound base on the carriage and square off the body of the shaper. With the screw 33 locked by the lock nut 34 and the clamping screw 28 of the post 26 kept tight the attachment can always be swung or returned to its original set up should it have been swung away from the original position for any purpose.

The inclined guide portion 32 has a bottom elongated slot 35 in which a slide block assembly 36 reciprocates and a vertically-spaced elongated slot 37 in which an upper slide block assembly 38 reciprocates. These slide assemblies 36 and 38 are connected together by a bar 39 that is flattened on its ends and secured to the assembly 36 by screws 41 and to the assembly 38 by screws 42. In this manner the slide assemblies 36 and 38 will be worked together. Between the slots 35 and 37, the inclined portion 32 is recessed at 40 to accommodate the work piece as a deep cut may be effected with a hacksaw blade, Fig. 19.

The slide block assembly 36 comprises a block 43 that is shouldered at 44 and has a portion 45 that extends through the slot 35. The block 43 is held against outward displacement from the slot 35 by a retaining plate 46 which is made secure to the portion 45 of the block by screws 47 and which has bent portion 48 that rides along the upper edge of the inclined portion 32 of the attachment bracket 29, Figs. 2 and 13. The block 43 has a vertical slot 49 in which a tool element holder may be fixed and secured by a screw bolt 50. This block 43 has a horizontal slot 52 for receiving a tool holder in order to extend the tool element in a different plane. A screw bolt, as indicated at 53, Fig. 13, can be extended through a threaded opening 54, Fig. 10, to secure the tool element holder in the longitudinal slot 52.

The vertically-spaced slide assembly 38 is similarly constructed and comprises a slide block 54, Fig. 14, having a projection 55 extending through the slot 37 and a shoulder 56 engaging with the side of the inclined portion of the bracket body 32. A retainer plate 57 is secured to the projection 55 by screws 58 and this retainer plate has a portion 59 that runs along the top edge of the inclined portion 32. The block 54 has a vertically-extending slot 60 for receiving a tool element holder and a threaded opening 61 for receiving the attaching bolt 62. This block 54 also has a top slot 63 angled from the vertical slot 60 for receiving a tool element holder and a threaded opening 64 for receiving the clamping screw bolt 62. The slots 60 and 63 are angled with respect to each other and both extend inwardly from the same corner of the block 54. The tool holder bar when placed in the top slot 63 will permit the tool element to cut the stock piece from a different angle than when the tool holder bar is mounted in the vertical slot and toward the chuck.

Connected to the upper end of the inclined portion 32 of the bracket 29 is a bent frame member 66 having its lower ends brought together and fixed by rivets 67 to the upper end of the bracket portion 32. The upper end of the bracket portion 32 is enlarged and has a hole 68 through which a drive rod or shaft 69 slides. This drive rod or shaft is threaded to the projection 55 of the slide block 54 as indicated at 68, Fig. 2. The drive rod 69 is threaded as indicated at 71 and surrounding a portion of the same is a compression or return spring 72. The lower end of this spring 72 is contained in a washer 73 engaging the upper end of the bracket portion 32 and the upper end of the spring is contained in a washer 74 that can be adjusted along the rod 69 by adjusting nuts 75 to alter the tension of the spring 72. This spring 72 assists the power means during the cutting stroke.

A crosshead 76 is disposed on the upper end of the rod 69 and is held in an adjusted position thereon by lock nuts 77 and 78. The crosshead 76 has a projection 79 to which a link 81 is pivotally connected and held in place thereon by a cotter pin 82. This link 81 is pivotally connected by a screw 83 and a nut 84 to a crank arm 85 that is fixed by a set screw 86 to a crank shaft 87 journalled in a bearing 88 fixed to the side of the frame member 66. The shaft 87 may be powered by a pulley, as shown in Fig. 2, or by a hand crank, as shown in Fig. 12, in a manner to be later explained.

The crosshead 76 has a projection 89 that extends through a vertically-extending slot 90 in the frame member 66 and to which an outer drive rod 91 is attached. A cotter pin 91' holds the outer rod 91 on the projection 89. This drive rod 91 is threadedly connected as indicated at 92, to the slide block 54, Fig. 2, and is locked in place by a lock nut 93. The lock nuts 77 and 78 and 93 can be adjusted to centralize slot assemblies in their respective guide slots 35 and 37. This drive assembly by the use of two rods is thus made rigid and is adapted to assume heavy load and shock.

The drive rod or shaft 69 has an unthreaded guide extension 94 that extends upwardly through a sleeve guide 95 which is threaded to the upper end of the frame member 66 and which has a rounded cap 96 with a hole 97 adapted to receive oil so that the extension 94 will be lubricated in the guide sleeve bearing 95. This sleeve guide 95 supports the upper end of the shaft 69 and serves as a protecting cover therefor.

One form of tool element holder which may be fixed in the slots of the slide assemblies 36 and 38 is shown in Figs. 1, 2 and 10. This holder is indicated generally at 100 and comprises a bar 101 that is recessed and shouldered at the opposite ends as indicated at 102 and 103 so that the ends can be fitted into either the vertical or top slots of the slide block assemblies. This bar 101 has an elongated slot 104 through which clamping screws 105 and 106 may extend and slide when loose. These clamping screws 105 and 106 are threaded to a clamp plate 107 which is recessed at 108 to retain a cutting tool point 109 against sliding movement along the bar 101. While, as shown in Fig. 2, the tool assembly 100 is disposed in the vertical slots, it will also be apparent that it can be disposed in the top slots and made secure by the same screw bolts 53 and 62. As the crank shaft 87 is turned, the crank arm 85 will act upon the link 81 which through crosshead 76 will cause drive rods 69 and 91 to be reciprocated, Fig. 12. These drive rods being rigidly connected to the slide block assembly 38 and the slide block assembly 36 being rigidly connected to the slide block assembly 38 through the bar 39 and the tool holder 100, the cutting tool point 109 will be operated in a true and precise manner. As shown in Fig. 12, a hand crank 111 is fixed to the shaft 87 and this crank has a handle 112 journalled to the outer end thereof and as the crank 111 is turned, the tool point 109 will cut into the work piece. The tool holder 100 provides a rigid tool point and is used when the power is applied by the hand crank 111 and hand-operated.

To this same shaft 87 there may be attached a pulley wheel 113, Fig. 2, instead of the crank 111, so that a connection can be made through a pulley belt 114 with a pulley pinion 115 of an electric motor 116, Figs. 1 and 5. The pulley 113 is fixed to the shaft 87 by a set screw 117. The pulley belt 114 is preferably of V-section.

The electric motor 116 has a bottom saddle plate 118 that has open transverse slots 119 and 120. The plate 118 is fixed to the motor housing and is rigid therewith. To support the electric motor in a position of alignment with the pulley wheel 113, a supporting plate 121 is provided. This plate has on one end thereof a socket formation 122 which is slid over the horizontal projection 31 of the inclined bracket 29 that extends through the tool post 26. This supporting plate 121 is made secure on the portion 31 by a set screw 123. The supporting plate 121 has spaced elongated slots 124 and 125 over which the respective transverse slots 119 and 120, respectively, of the saddle plate 118 extend. Guide bolts 126, 127 are respectively carried by the elongated slots 124 and 125. These guide bolts 126 and 127 may be made sufficiently loose to allow the saddle plate to be adjusted under them, and they are held against upward and outward displacement by nuts 128 and 129 disposed respectively on their lower ends.

Once the pulley belt 114 is in place over the motor pinion 115, the saddle plate 118 can be swung to a position so that a threaded rod 130 can be hinged downwardly into a vertically-extending slot 131 provided by an upwardly turned bifurcated portion 132 of the plate 121. This rod 130 has a bifurcated portion 133 for receiving an upwardly turned projection 134 of the plate 118 and hingedly connected thereto by a pin 135. A thumb nut 136 can be tightened upon the rod 130 and against the bifurcated portion 132 so as to hold the saddle plate and the electric motor against displacement relative to the supporting plate 121 and also to adjust quickly the pulley belt to the desired tightness.

The supporting plate 121 carries a toggle switch 137 having a handle 138 projecting upwardly through the supporting plate and to which cable wires 139 are extended to an electric source in the wall of the building near the turning lathe. It will now be apparent that the present attachment is powered independently of the lathe, either by hand or by the electric motor.

The work piece may take the form of a rod, as shown in Fig. 10, and can extend between the lathe spindle 140 and jaws 141 of a drive chuck 142 of the lathe. The drive chuck 142 will be made fixed by locking devices on the lathe and with the cutting point 109 registered with the work piece, a cut 144 will be made therein. At the same time the hand knobs of the carriage compound will be adjusted by hand so that the cutting point 109 will be progressed to deepen the slot each time that the cutting point 109 is reciprocated.

As shown in Fig. 11, a work piece 145 can be connected to the chuck 142 transversely of the longitudinal axis thereof and the attachment similarly arranged beneath the work piece to make a longitudinal slot or cut 146 therein. The work piece 145 may have a flat underface and a keyway or slot 146 will be worked thereinto by the cutting point 109.

While in Figs. 10 and 11, the tool element assembly 100 is shown in the vertical slots of the slide assemblies, it will be understood that the tool element assembly 100 can be placed in the top slots of the slide assemblies and the tool element or point 109 extended parallel to the axis of the lathe so as to make a cut on the end face of a work piece. To obtain a keyway slot, as indicated at 148, in Fig. 22, the tool element assembly 100 is arranged in the top slots of the slide assemblies and the work piece held in the manner as shown in Fig. 11 of the chuck 142.

Another type tool holder is shown in Figs. 3, 4 and 5. This holder is indicated generally at 150 and includes a bar 151 having a series of threaded holes 152 longitudinally spaced therealong. The bar 151 is shouldered at its opposite ends as indicated at 153 and 154 and have therein holes 155 and 156 respectively. An oversized slide 157 is adjustable along the bar 151. This slide surrounds the bar 151 and has a depending projection 158 with a hole 159 thereon for receiving an extension 160 of a threaded bolt 161 in the bar 151. To this slide 157 a tool element 162 is fixed by a clamping plate 163 and clamp screws 164 and 165, Fig. 5.

The threaded bolt 161 is fitted to any one of the openings 152 of the bar 151 and is held in a locked position therewith by a lock nut 166. This screw 161 has a head 167 with a slot 168 therein for retaining the end of a coil spring 169. The spring 169 can be adjusted to different tensions and retained in the adjusted position by the lock nut 166. The outer or free end of the coil spring 169 is held against either pin 170 or 171 so as to urge the tool element 162 toward work piece 172. On the cutting stroke the tool element 162 will effect a cut on the work piece 172, Fig. 4, but on the return stroke the cutting element will be pushed back away from the work piece and the slide 157 tilted on the bar 151 as illustrated in Fig. 4. The same angled cuts can be made with this tool holder 150 as with the tool holder 100, and the tool point is fed by the hand knobs of the carriage without concern of the cutting point being over-extended into the work piece on the return stroke. The tool element will automatically free itself from the work piece on each return stroke.

These tool element holders 100 and 150 can be replaced by a file element 173, Figs. 13 and 15. This file element has reduced end portions 174 and 175 which respectively have holes 176 and 177 therein, by which the file element is attached to the slots of the slide block assemblies 36 and 38. The attaching screws or bolts 53 and 62 are extended through the holes 176 and 177 so as to make the file element secure with the slide block assemblies. It will be seen that this file element can be arranged in either the vertical slots or the top slots and that similar cuts can be effected with the file element as with the tool element. While this file is used the power to the lathe may be turned. With round stock driven by the lathe chuck, the lathe carriage can be operated by the drive mechanism and the file advanced automatically over the stock.

Referring now particularly to Figs. 16, 17 and 19, it will be seen that there can be also attached to the slide block assemblies 36 and 38, one or two hack saw blades 180. Each blade has a hole 181 on each end thereof through which the fastening screw bolt 53 or 62 is extended to secure the blade or blades to the slide block assemblies. The slots in the slide assemblies are sufficiently wide to accommodate two blades so that a cut equal in width to the thickness of two blades can be effected. If only one blade 180 is used a spacer member 182 is fitted in each slide assembly slot along with the hack saw blade. This spacer has a slot 183 through which the attaching bolt 53 or 62 can pass. The sides of the spacer 182 are folded up to provide guide flanges 184 and 185 for retaining the spacer element in the slide assembly slot against angular displacement therefrom. By using two blades a cut such as indicated at 186, Fig. 22, can be effected in the stock piece. A single blade will effect an extension of this cut as indicated at 187, Fig. 22.

If it is desired to stop the motion of the slide assembly and to utilize the attachment as a single ordinary tool with the cutting point, file or hack saw element retained in a rigid and fixed cutting position, power is removed from the attachment and a set screw 188 in the enlarged upper end of the inclined portion 32 of the bracket on main body 29 is tightened upon the drive rod or shaft 91, Figs. 1 and 18. It is locked in this position by a lock nut 189. The work piece will then be connected to the chuck 142 of the lathe and rotated in the usual manner as when the lathe is used with the ordinary cutting tools. The attachment being fixed to the carriage can be adjusted and used in the same manner as the ordinary tool bit is used.

In order to do internal cutting on a hollow work piece or shaft 191, Figs. 7, 8 and 9, a special work holder 192 is provided. This work holder has a round projection 193 which is fixed to the chuck 142. The work holder is generally round and is open on one face. Secured to one side of the work holder are clamping plates or jaws 194 and 195. These plates are respectively adjustable by screws 196 and 197 toward or away from the work piece whereby to fix the work piece in the holder 192 or to release the work piece. Threaded openings are provided in the work holder to accommodate the screws 196 and 197 and the ends of the screws swivel in the plates or jaws 194 and 195. A set screw 198 is adapted to adjust the work in the vise to align parallel with the motion of the cutting bit, a lock nut 199 holds the set screw in its adjusted position.

A tool bit holder 200 of L-shape is connected to the slide 157 of the holder 150 shown in Fig. 3. This holder 200 can extend into the opening in the work piece 191 and is worked longitudinally thereof. The holder 200 has a set screw 201 in the end thereof for securing a cutting point or bit 202 in a transverse hole thereof. The bit 202 extends transversely of the holder and engages with the interior of the work piece to effect therein a keyway slot 203 as the holders 150 and 200 are reciprocated. At this time the chuck 142 is held locked against rotation on the lathe and the work holder 192 extends at an angle parallel to the attachment and to the motion of the slide assemblies.

In Figs. 20 and 21 there is shown a two-part bracket structure comprising a part 205 having a shank 206 and an inclined part 207 adjustable relative to the part 205 to different inclined positions. The part 205 has an enlarged portion 208 with an inclined front face 209 flush against which is fixed the part 207 by a fastening bolt 210. Projecting from the front face 209 are diametrically opposite pin projections 211 and 212 adapted to fit respectively in either of angularly spaced holes 213 or 214. The part 207 has a hole 213 through which the screw bolt 210 extends and the enlarged portion 208 has a threaded hole 214 for receiving the screw bolt 210. The part 207 has elongated slots 215 and 216 for slidably receiving the slide block assemblies 36 and 38. It will be seen that with this two part assembly that the cutting point can be raised or lowered to change the angle of cut upon the work piece. By the above described adjustment of the electric motor on its supporting plate 121 the pulley belt can be adjusted to compensate for the different adjustments of the two parts. The part 207 is recessed at 217 to accommodate the work piece as a cut is effected with a hack saw upon bar stock to cut off a piece thereof.

It should now be apparent that there has been provided a combined shaping, filing and sawing attachment for metal turning lathes which can be connected to the tool post of the compound carriage of the lathe and can be adjusted to locate the cutting point in the different planes in the same manner that an ordinary cutting tool is adjusted by the carriage and which is self-driven and can effect upon a work piece cuts in the nature of transverse slots, keyways, flat cuts, square cuts, and other shaping operations which cannot be made with the standard lathe. The metal lathe is thereby converted into a combination lathe and shaper and as well can effect filing and hack saw operations. It will be apparent that the attachment can be made of different sizes, and the stroke can be increased or decreased as desired.

While various changes may be made in the detailed construction, it shall be understood that such changes shall be within the spirit and scope of the present invention as defined by the appended claims.

What is claimed is:

1. In a combined shaping, filing and sawing attachment for metal turning lathes, an attaching body structure having an inclined portion and a horizontal shank portion adapted to be connected to a tool post of a lathe carriage, said inclined portion having guideways therein, slide block assemblies operable in said guideways, drive shaft means carried on the inclined portion and connected to the slide block assemblies to operate the same means cooperatively engaging the drive shaft means to urge same in return movement, power means connected to the drive shaft means and carried by the body structure to reciprocate the drive shaft means, inner rod means connected between the slide blocks assemblies to rigidly secure the lower block assembly to the upper block assembly, and tool means detachably connected between said slide block assemblies whereby to be worked by the same.

2. In a combined shaping, filing and sawing attachment for metal turning lathes, an attaching body structure having an inclined portion and a horizontal shank portion adapted to be connected to a tool post of a lathe carriage, said inclined portion having vertically-spaced guideways therein, slide block assemblies operable in said guideways, drive shaft means carried on the inclined portion and connected to the slide block assemblies to operate the same means cooperatively engaging the drive shaft means to urge same in return movement, drive crank means connected to the inclined portion and to the drive shaft means to operate the same, said drive crank means including an extension frame having a guide slot therein and a crosshead connected to the drive shaft and having a projection extending through the guide slot of the extension frame, a secondary drive rod connected between the projection of the crosshead means and the upper slide block assembly whereby providing a rigid drive connection between the crosshead means and the slide block assemblies and means adjustably connecting the crosshead means to the drive shaft means and means adjustably connecting the secondary rod to the upper slide block assembly whereby the slide block assemblies may be centralized in the body slots.

3. In a combined shaping, filing and sawing attachment for metal turning lathes, an attaching body structure having an inclined portion and a horizontal shank portion adapted to be connected to a tool post of a lathe carriage, said inclined portion having guideways therein, slide block assemblies operable in said guideways, drive shaft means carried on the inclined portion and connected to the slide block assemblies to operate the same, an extension frame fixed to the upper end of the inclined portion, said drive shaft means extending upwardly through said extension frame, a guide sleeve extending from the extension frame and serving to guide the upper end of the guide shaft means and as a protecting shield for the operator and drive crank means connected to the extension frame and to the drive shaft means to operate the drive shaft means.

4. In a combined shaping, filing and sawing attachment for metal turning lathes, an attaching body structure having an inclined portion and a horizontal shank portion adapted to be connected to a tool post of a lathe carriage, said inclined portion having guideways therein, slide block assemblies operable in said guideways, drive shaft means carried on the inclined portion and connected to the slide block assemblies to operate the same, power means connected to the guide shaft and carried by the attaching body structure to reciprocate the drive shaft means, and tool means detachably connected between said slide block assemblies whereby to be worked by the same, and set screws means on the inclined portion and engageable with the drive shaft to rigidly retain the drive shaft of the slide block assemblies against operation whereby the attachment can be used as a rigid and ordinary tool with the work being moved by the drive chuck of the lathe.

5. In a combined shaping, filing and sawing attachment for metal turning lathes, an attaching body structure having an inclined portion and a horizontal shank portion adapted to be connected to a tool post of a lathe carriage, said inclined post having guideways, drive shaft means carried on the inclined portion and connected to the slide block assemblies to operate the same, power means connected to the drive shaft means and carried by the attaching body structure to reciprocate the drive shaft tool means with a tool holder bar detachably connected between said slide block assemblies whereby to be worked by the same, and each of said slide block assemblies having a slide block with angularly opposed tool holder-receiving slots extending from one corner of the slide block, a projection on the block extending through the elongated slot of the body inclined portion and retaining plate means connected to the slide block projection and holding the block in place upon the inclined portion, said tool holder bar having portions adapted to be fitted in either of the slots of the slide block and a screw bolt threaded into the slide block for holding the tool holder bar securely in place in the slot thereof.

6. In a combined shaping, filing and sawing attachment for metal turning lathes, an attaching body structure having an inclined portion and a horizontal shank portion adapted to be connected to a tool post of a lathe carriage, said inclined portion having guideways, drive shaft means carried on the inclined portion and connected to the slide block assemblies to operate the same, power means connected to the drive shaft means and carried by the attaching body structure to reciprocate the drive shaft, and tool means detachably connected between said slide block assemblies whereby to be worked by the same, and said tool means including a tool holder bar connectable between the slide block assemblies, a slide clamp adapted to be fixed at different positions on the holder bar, and an L-shaped member detachably connected to the slide clamp and having a transverse bit opening in the upper end thereof, a tool bit extending through the transverse opening and a screw in the end of the L-shaped member adjustable to fix said tool bit in the transverse opening.

References Cited in the file of this patent

UNITED STATES PATENTS

| | | |
|---|---|---|
| 662,492 | Mingst | Nov. 27, 1900 |
| 1,000,159 | Duke | Aug. 8, 1911 |
| 1,030,598 | Miller | June 25, 1912 |
| 1,661,509 | Skinner | Mar. 6, 1928 |
| 2,089,078 | Tyson | Aug. 3, 1937 |
| 2,600,787 | Lodwick | June 17, 1952 |